(12) United States Patent
Srivastava et al.

(10) Patent No.: US 8,878,135 B2
(45) Date of Patent: Nov. 4, 2014

(54) LITHIUM BASED SCINTILLATORS FOR NEUTRON DETECTION

(75) Inventors: Alok Mani Srivastava, Niskayuna, NY (US); Adrian Ivan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 470 days.

(21) Appl. No.: 13/358,638

(22) Filed: Jan. 26, 2012

(65) Prior Publication Data
US 2013/0193329 A1 Aug. 1, 2013

(51) Int. Cl.
*G01T 1/20* (2006.01)

(52) U.S. Cl.
CPC .................................. *G01T 1/20* (2013.01)
USPC ....................................... 250/361 R; 250/362

(58) Field of Classification Search
USPC ........... 250/361 R, 362; 252/301.4 H, 301.36
See application file for complete search history.

(56) References Cited

U.S. PATENT DOCUMENTS

| | | | |
|---|---|---|---|
| 7,141,794 B2 * | 11/2006 | Srivastava et al. ........ 250/361 R |
| 7,501,077 B1 | 3/2009 | Hodges et al. | |
| 7,977,645 B1 | 7/2011 | Shah et al. | |
| 2003/0160178 A1 | 8/2003 | Katagiri | |
| 2005/0135535 A1 | 6/2005 | Wallace | |
| 2005/0224720 A1 | 10/2005 | Dai et al. | |
| 2009/0272910 A1 | 11/2009 | Grynyov et al. | |
| 2011/0204243 A1 | 8/2011 | Bendahan et al. | |

FOREIGN PATENT DOCUMENTS

| EP | 2067815 A2 | 6/2009 |
|---|---|---|
| EP | 2256177 A1 | 12/2010 |

OTHER PUBLICATIONS

M. Danang Birowosuto, et al; Li-Based Thermal Neutron Scintillator Research; Rb2LiYBr6: Ce3+ and other Elpasolites; IEEE Transactions on Nuclear Science, Jun. 2008, pp. 1152-1155, vol. 55, No. 3.

* cited by examiner

*Primary Examiner* — Constantine Hannaher
*Assistant Examiner* — Gisselle Gutierrez
(74) *Attorney, Agent, or Firm* — Andrew J. Caruso

(57) ABSTRACT

A neutron scintillator composite (NSC) is made of a neutron scintillator and a binder. The neutron scintillator of the composite has the formula $Li_yMgBr_{y+2}$, where y=2, 4 or 6 and may further comprise cerium as a scintillation activator. The binder of the composite has an index of refraction substantially identical to that of the neutron scintillator. The neutron scintillator and binder are mixed into a solid or semi-solid neutron scintillator composite having sufficient flowability for molding into a shaped article, such as a neutron sensing element of a radiation detector. The neutron scintillator composite collects and channels photons through the material itself and into a photosensing element optically coupled to the composite. Because the indices of refraction for both the neutron scintillator and the binder are substantially identical, scattering at the scintillator-binder interface(s) is minimized, thereby producing transmission efficiencies that approach single crystals.

27 Claims, 6 Drawing Sheets

LITHIUM BASED SCINTILLATORS FOR NEUTRON DETECTION

BACKGROUND

The present disclosure is generally related to scintillators and, more particularly, to scintillator compositions for detecting neutrons and methods of making the same.

Scintillator materials (hereinafter scintillators) are widely used in detectors for high-energy radiation, e.g. gamma rays, X-rays, cosmic rays, neutrons, and other particles characterized by an energy level of greater than or equal to about 1 keV. The scintillator is coupled with a light-detection means, such as, for example, a photosensor. When radiation impacts the scintillator, the scintillator emits light. The photosensor produces an electrical signal proportional to the number of light pulses received, and to their intensity. Scintillators are in common use for many applications. Examples include medical imaging equipment, e.g., positron emission tomography (PET) devices; well logging for the oil and gas industry; portable and hand-held detectors for homeland security; and various digital imaging applications.

In the detection of neutrons by solid-state scintillation, perhaps the most highly-utilized material stems from a granular mixture of 6-LiF and ZnS:Ag. Each component in this mixture represents "best-of-class" performance (i.e., respectively, neutron capture and luminescence). For neutron capture, the LiF crystal structure offers one of the highest Li site densities in the solid-state and therefore maximizes the probability of neutron interaction when enriched in 6-Li. For luminescence, ZnS:Ag is one of the brightest phosphors known and remains unparalleled in its emission under alpha and triton exposure (i.e., the by-products of 6-Li neutron capture). Thus, the combination of 6-LiF and ZnS:Ag, held together by an optically-transparent binding material (binder), forms a neutron scintillator composite (NSC) with exceptional efficiency.

Unfortunately, neutron scintillator composites, when comprised of such granular mixtures (e.g., 6-LiF/ZnS:Ag, 10-$B_2O_3$/ZnS:Ag, etc.), suffer from optical losses due to the scattering of light at internal interfaces and the absorption of light during transmission. The latter is aided by ZnS:Ag which can self-absorb its own luminescence. These loss mechanisms create a thickness limitation: increasing the NSC thickness beyond a certain threshold value (e.g., about 1.0 mm for 6-LiF/ZnS:Ag mixtures) provides no further light output despite the additional capability for neutron absorption. Thus, large continuous volumes are not accessible, and equally important, many useful shapes cannot be implemented without significant workarounds.

BRIEF DESCRIPTION

The invention solves the problem of optical transparency by: [1] combining the neutron capture and luminescence functionality into a single scintillator composition and [2] index-matching the binder material with the neutron scintillator material. These characteristics significantly reduce internal absorption and scattering, thereby increasing the light output of the NSC body. As a result, the number and intensity of optical pulses reaching the photosensor increases, which in turn, dramatically improves neutron detection efficiency.

The amount of internal absorption and scattering is dependent on the type and surface area of optical interfaces in an NSC. For conventional NSCs incorporating granular mixtures (e.g., 6-LiF/ZnS:Ag), the number of possible optical interfaces is five (e.g., 6-LiF/binder, ZnS:Ag/binder, 6-LiF/ZnS:Ag, 6-LiF/6-LiF, and ZnS:Ag/ZnS:Ag). In contrast, the number of possible interfaces for the invention is two: scintillator-binder and scintillator-scintillator. The latter, which represents contact between the same material, is already index-matched so the number of interfaces is effectively one. Incorporating a single composition therefore reduces optical complexity and enhances transparency.

Furthermore, neutron scintillators of the disclosure exhibit indices of refraction (n~1.3-1.7) that overlap with known epoxies, thermoplastics, low-melting inorganic glasses, and the like (n~1.4-1.6). The compositions therefore enable index matching, which is exploited to eliminate optical losses at the scintillator-binder interface. This transparency improvement allows large continuous volumes of useful shapes, by-passing the need to pursue more expensive single-crystal embodiments. In contrast, conventional NSCs often contain ZnS:Ag whose high index of refraction (n~2.2) prevents index-matching with known binders. Bodies of conventional NSCs are therefore opaque and limited to thicknesses less than 1 mm.

Moreover, neutron scintillator composites of the disclosure, for example those in which the binder is a polycarbonate resin or the like, have a high impact resistance. This strength enables the production of large neutron detectors.

SUMMARY

In one aspect, therefore, the disclosure relates to a neutron scintillator composite comprising a cerium-containing neutron scintillator having non-zero concentrations of lithium (Li), magnesium (Mg) and bromine (Br), and a binder having an index of refraction that is substantially identical to an index of refraction of the neutron scintillator. In some embodiments, the Li in the cerium-containing neutron scintillator is enriched in $^6$Li.

In a related aspect, the disclosure relates to a neutron scintillator composite comprising a cerium-containing neutron scintillator of the formula:

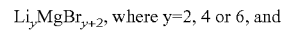

$Li_yMgBr_{y+2}$, where y=2, 4 or 6, and a binder material having an index of refraction that is substantially identical to an index of refraction of the neutron scintillator.

In another aspect, the disclosure relates to a neutron scintillator composite comprising a cerium-containing neutron scintillator of the formula:

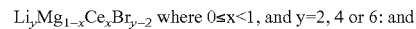

$Li_yMg_{1-x}Ce_xBr_{y-2}$ where 0≤x<1, and y=2, 4 or 6; and a binder material having an index of refraction that is substantially identical to an index of refraction of the neutron scintillator.

In yet another aspect, the disclosure relates to a neutron scintillator composite comprising a cerium-containing neutron scintillator of the formula:

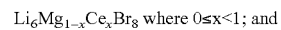

$Li_6Mg_{1-x}Ce_xBr_8$ where 0≤x<1; and a binder material having an index of refraction that is substantially identical to an index of refraction of the neutron scintillator material.

In yet another related aspect, the present disclosure relates to a neutron detector comprising the neutron scintillator composite described herein.

In another aspect, the present disclosure relates to a method for fabricating a neutron scintillator composite, the method comprising mixing a cerium-containing neutron scintillator including non-zero concentrations of Li, Mg and Br, with a binder having an index of refraction that is substantially identical to an index of refraction of the neutron scintillator. In some embodiments, the binder provides sufficient flowability to the mixture so that the neutron scintillator composite can be formed into a shaped article.

In yet another aspect, the present disclosure relates to a method for fabricating a neutron scintillator composite, the method comprising mixing a cerium-containing neutron scintillator of formula $Li_yMg_{1-x}Ce_xBr_{y+2}$ where $0 \leq x < 1$, and $y = 2, 4$ or $6$ with a binder having an index of refraction that is substantially identical to an index of refraction of the neutron scintillator.

In a related aspect, the binder may be chosen from a thermoplastic resin or thermoset resin, including but not limited to a resin selected from the group consisting of polyacetal, polyacrylic, polyamide, polyamideimide, polyanhydride, polyarylate, polyarylsulfone, polybenzimidazole, polybenzothiazinophenothiazine, polybenzothiazole, polybenzoxazole, polycarbonate, polycarborane, polydibenzofuran, polydioxoisoindoline, polyester, polyether etherketone, polyether ketone ketone, polyetherimide, polyetherketone, polyethersulfone, polyimide, polyoxabicyclononane, polyoxadiazole, polyoxindole, polyoxoisoindoline, polyphenylene sulfide, polyphosphazene, polyphthalide, polypiperazine, polypiperidine, polypyrazinoquinoxaline, polypyrazole, polypyridazine, polypyridine, polypyromellitimide, polypyrrolidine, polyquinoxaline, polysilazane, polystyrene, polysulfide, polysulfonamide, polysulfonate, polysulfone, polytetrafluoroethylene, polythioester, polytriazine, polytriazole, polyurea, polyvinyl alcohol, polyvinyl ester, polyvinyl ether, polyvinyl halide, polyvinyl ketone, polyvinyl nitrile, polyvinyl thioether, and combinations thereof.

In yet another aspect, the disclosure relates to a method for making a neutron scintillator comprising: mixing amounts of LiBr, $MgBr_2$ and $CeBr_3$; grinding the mixture to a fine powder, and heating the mixture to a temperature of about 600° C. to about 800° C. to yield a neutron scintillator of formula $Li_yMgBr_{y+2}$, where $y = 2, 4$ or $6$. A neutron scintillator composite of the disclosure is then made by mixing the neutron scintillator with a binder having an index of refraction that is substantially identical to an index of refraction of the neutron scintillator. The neutron scintillator composite can be formed into a shaped article, such as a neutron detector.

DRAWINGS

These and other features, aspects, and advantages of the present invention will become better understood when the following detailed description is read with reference to the accompanying drawings.

DETAILED DESCRIPTION

Figure 1:
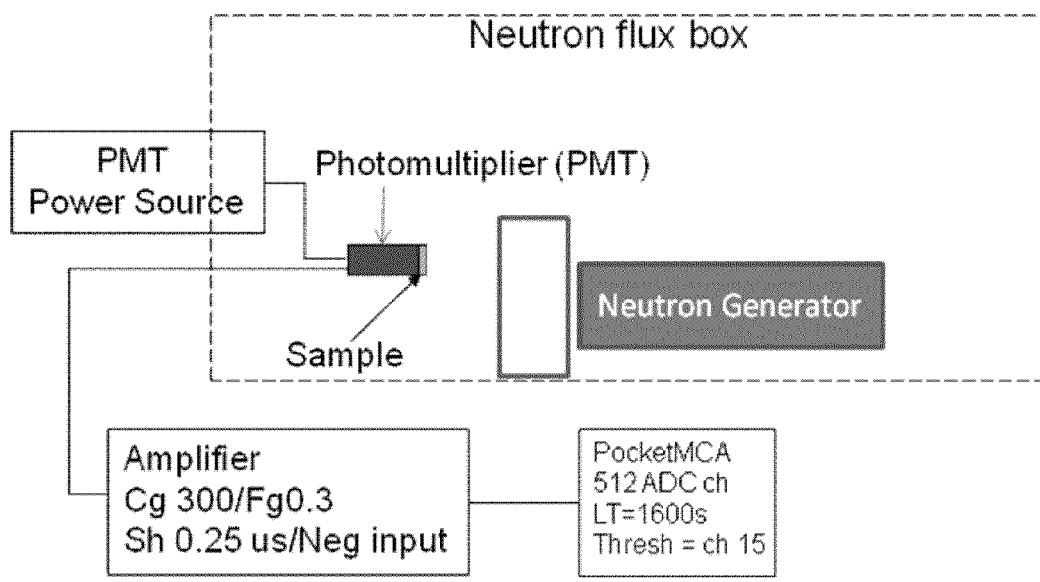
FIG. 1 is a schematic of the neutron flux apparatus used to evaluate the neutron scintillator composite of the disclosure.

All references, including patents and published applications, cited herein, are hereby incorporated by reference in their entirety into the subject application.

The details of the neutron scintillator composite (NSC) of the disclosure comprising a neutron scintillator and a binder will now be described.

I. Neutron Scintillator

In general, the ability of the neutron scintillator to detect neutron radiation stems from the presence of 6-Li, which exhibits a large cross section for thermal neutron capture. The capture process results in the disintegration of 6-Li, producing charged alpha and triton products as detailed in the 6-Li $(n,\alpha)$ reaction below:

$^6Li + {}^1n \longrightarrow {}^4\alpha + {}^3H (Q = 4.78 \text{ MeV})$

The 4.78 MeV kinetic energy of the charged alpha and triton particles (i.e., Q) is high and enables a significant "per event" energy transfer into the 6-Li host. Thus, by incorporating 6-Li, materials are created that offer exceptional capability for neutron absorption. This invention integrates 6-Li into the neutron scintillator material whose crystalline lattices are highly-efficient at transferring energy to scintillation activators. These activators, after excitation, decay back into their ground states, producing photons characteristic of scintillation phenomena.

The 6-Li enrichment of the neutron scintillator material can vary from 0% < 6-Li ≤ 100% (i.e., the 6-Li enrichment should be non-zero). 6-Li natural abundance is 7.59% and the highest commercial source is currently 95%. In the compositional descriptions that follow, references to "Li" presume a non-zero 6-Li enrichment.

In an aspect of the invention, the neutron scintillator of the disclosure incorporates cerium as a scintillation activator. The incorporation of a cerium ion into the neutron scintillator of formula (I) below increases the light yield of the neutron scintillator material as compared to a neutron scintillator that does not incorporate the cerium ion. The incorporation of cerium as a scintillation activator is described in U.S. Pat. App. Pub. No. 2008/0131347 A1 (Srivastava, et al.), the entire contents of which are incorporated herein by reference.

In one embodiment, the neutron scintillator comprises a compound having the formula $Li_yMg_{1-x}Ce_xBr_{y+2}$, where $y = 2, 4$ or $6$ (I)

and Li comprises nuclides of one of 6-Li and 7-Li and x can have values from 0 up to, but not including, 1.

The above-mentioned neutron scintillators of formula (I) incorporating cerium are self-activating. In other words, the neutron scintillator compositions of the invention do not use a separate activator compound because cerium functions as both the activator (i.e., the emission source of the neutron radiation measured by a scintillation detector) and a host element.

In one embodiment, the cerium ions are incorporated into the neutron scintillator of formula (I) by the use of cerium bromide. In an exemplary embodiment, the cerium bromide is added simultaneously to the neutron scintillator of formula $Li_yMgBr_{y+2}$, where y=2, 4 or 6 to form a solid solution. Methods for preparing such solid-state solutions are described in U.S. Pat. App. Pub. No. 2008/0131347 A1 (Srivastava, et al.), the entire contents of which are incorporated herein by reference.

In another embodiment, stoichiometric amounts of cerium bromide, lithium bromide and magnesium bromide are mixed, ground to a fine powder and then heated to temperatures in the range of about 600° C. to about 800° C. The heating step is performed in an environment essentially free of moisture and air, for example in a furnace situated in an evacuated glove box.

It should also be understood that the above-mentioned neutron scintillators may contain small amounts of impurities. These impurities usually originate with the starting materials, and generally constitute less than about 0.1% by weight of the neutron scintillator material, and generally constitute less than about 0.01% by weight of the neutron scintillator material.

The neutron scintillators may also include parasitic phases, whose volume percentage is usually less than about 1%. Moreover, minor amounts of other materials may be purposefully included in the scintillator compositions, as described in U.S. Pat. No. 6,585,913 (Lyons et al.), the entire contents of which is incorporated herein by reference. For example, minor amounts of other rare earth halides can be added to reduce afterglow. Calcium and/or dysprosium can be added to reduce the likelihood of radiation damage.

The neutron scintillators provide advantages over other commercially-available neutron scintillator materials. For example, the neutron scintillator of the disclosure can simultaneously exhibit a short decay time, a reduced afterglow, a high neutron absorption rate, and a high light output per neutron event. Additionally, the neutron scintillators can be manufactured economically, and when in powder form, be combined with binder materials to form large transparent and continuous volumes of useful shapes. Furthermore, neutron scintillator composites of the disclosure, for example those in which the binder is a polycarbonate resin or the like, have a high impact resistance making them suitable for the production of large neutron detectors.

In all the compositions, the 6-Li enrichment can vary from 0%<6-Li≤100% (i.e., the 6-Li enrichment should be non-zero). 6-Li natural abundance is 7.59% and the highest commercial source is currently 95%.

II. Transparent Binder

One aspect of the invention is that the inventors have discovered that the indices of refraction for the neutron scintillator described above fall within a range overlapping that of known epoxies, thermoplastics, and low-melting inorganic glasses (i.e., 1.3-1.6 versus 1.4-1.6, respectively). This overlap can be exploited to select a binder, such as an epoxy, a thermoplastic, a low-melting inorganic glass, and the like, which has a substantially identical index of refraction as the neutron scintillators described above. In other words, the binder is transparent to the wavelength of the photons emitted by the neutron scintillators described above and allows the photon to pass efficiently through the neutron scintillator composite (NSC) of the disclosure. As a result, the NSC of the disclosure has a transmissive capability for emitted photons that approaches that of a single crystal. Thus, the NSC of the disclosure has the capability to act as an optical waveguide to collect and channel photons within the NSC itself, thereby greatly increasing the optical efficiency of any radiation detector that may house the NSC of the disclosure.

In some embodiments, the binder used in the NSC of the disclosure comprises one or more of a thermoplastic resin or a thermoset resin. Thermoplastic and thermoset resins are known to those of skill in the art. In some embodiments, the binder comprises one or more resins selected from group consisting of acrylate-based resin, epoxy resin, siloxane resin, and combinations thereof. Where a thermoplastic resin is chosen, it may be selected from the group consisting of polyacetal, polyacrylic, polyamide, polyamideimide, polyanhydride, polyarylate, polyarylsulfone, polybenzimidazole, polybenzothiazinophenothiazine, polybenzothiazole, polybenzoxazole, polycarbonate, polycarborane, polydibenzofuran, polydioxoisoindoline, polyester, polyether etherketone, polyether ketone ketone, polyetherimide, polyetherketone, polyethersulfone, polyimide, polyoxabicyclononane, polyoxadiazole, polyoxindole, polyoxoisoindoline, polyphenylene sulfide, polyphosphazene, polyphthalide, polypiperazine, polypiperidine, polypyrazinoquinoxaline, polypyrazole, polypyridazine, polypyridine, polypyromellitimide, polypyrrolidine, polyquinoxaline, polysilazane, polystyrene, polysulfide, polysulfonamide, polysulfonate, polysulfone, polytetrafluoroethylene, polythioester, polytriazine, polytriazole, polyurea, polyvinyl alcohol, polyvinyl ester, polyvinyl ether, polyvinyl halide, polyvinyl ketone, polyvinyl nitrile, polyvinyl thioether, and combinations comprising one or more of the foregoing thermoplastic resin.

The binder of the disclosure may also include one or more of any conventional additives, e.g., antioxidants, UV absorbers, stabilizers, metal deactivators, peroxide scavengers, fillers, reinforcing agents, plasticizers, lubricants, emulsifiers, pigments, optical brighteners, flameproofing agents, antistatic agents, blowing agents, among others. When required or desired, these additives are chosen such that the requisite gamma insensitivity, optical transparency, and moldability are maintained. The binder may also advantageously substantially not fluoresce under irradiation by gamma rays, and may also advantageously be insensitive to degradation under gamma irradiation.

It is preferred to ensure that the chosen binder is an optically clear molding composition. Many of these are commercially available for use in optoelectronic applications, and the choice will depend upon the desired gamma ray insensitivity and optical clarity possessed by the material. Some such molding compositions include optically clear epoxy resins, non-limiting examples of which include EPOTEK 301-2 (available from Epoxy Technology, Billerica Mass.), and polycarbonates, for example those commercially available under the trade name, LEXAN®

In certain embodiments, the invention may involve the preparation of the transmissive moldable resin composition. In cases where the moldable resin composition is already of sufficient character to confer the desired flowability features to the final composition, it may be used substantially as received. Certain silicone (e.g., polydimethylsiloxane) resins may have sufficient plasticity. Room temperature vulcanization (RTV) silicone, RTV silicone rubber, and the like, may also be used. Alternatively, the resin can be a multipart reaction product that must be prepared prior to use. Certain epoxy resins may require this, as by, for example, combination of a hardener and a resin precursor.

III. Neutron Scintillator Composite (NSC)

In general, the NSC is made by mixing a quantity of binder with the neutron scintillator in the form of powder or particles to create a flowable mass. Generally, an amount of neutron scintillator equivalent to about 10% to about 60% by weight is used. More conveniently, the amount of neutron scintillator is equivalent to about 10% to about 30% by weight, and most conveniently, an amount of neutron scintillator equivalent to about 15% to about 20% by weight is used.

Next, before curing (if an epoxy binder is used) or solidifying (if a thermoplastic, glass, and the like is used) the flowable mass is molded, cast, extruded, and the like, into a shaped article useful for neutron detection. For example, the flowable mass can be formed into a monolith, a sheet, a filament, a cylindrical shell, a straw, and the like, resulting in the shaped article.

The NSC composite is characterized by an ability to enable simplified fabrication of shaped articles. As used herein, "shaped articles" includes, but is not limited to: layers, sheets, rods, blocks, wires, nets, lenticular fixtures, fibers, etc. (via processes including tape-casting and extrusion); complex bodies, etc. (via processes including machining or casting); and conformal coatings, etc. (via processes including spraying, dipping, or spinning) All of these aforementioned "shaped articles" constitute "articles" according to the present disclosure and claims.

As noted above, the neutron scintillator is mixed with the binder, such as a resin, to fabricate the NSC composite. In certain embodiments, this requires the admixing of granular neutron scintillator material in the form of powder or particles with the resin. In such an embodiment, the granular material is added to the resin under effective conditions such as agitating, filtering, straining, pressing, crushing, deagglomerating, and the like. The conditions are effective to achieve or maintain an intimate mixture or dispersion, and to form a moldable, neutron sensitive composition as a solid or semi-solid with sufficient flowability for molding into a shaped article. Any remaining aggregates of granular starting material can be removed or disintegrated by sizing, straining, sieving or otherwise further deagglomerating the mixture. Such a step of deagglomeration can eliminate any entrapped bubbles as well as break up aggregates. It is desirable, although not required, to attain a smooth and/or creamy mixture. In some embodiments, a smooth and/or creamy intimate dispersion of the neutron scintillator material in the resin offers advantages, possibly including an advantageous reduction in streaking during casting into an article.

A shaping step is required for fabrication of the moldable NSC composite into the shaped article. Persons skilled in the art know a wide variety of shaping steps for composite materials containing resins. Among the processes by which a moldable, NSC composite may be shaped into an article includes one or steps such as tape-casting, slip-casting, extrusion, pultrusion, injection molding, compression molding, blow molding, rolling, thermoforming, vacuum forming, kneading, pressing, coating, spraying, printing, and combinations thereof, and the like. The particular method chosen is not especially critical, but depends upon the desired final shape. In certain embodiments, the constituents and/or consistency of the moldable neutron sensitive composition may have an impact upon the choice of parameters by which the shaping step is conducted. For example, if the solids content of the moldable neutron sensitive composition is too high, the composition may be too viscous for efficient use. On the other hand, if the solids content of the moldable neutron sensitive composition is too low, then sedimentation of the solids could occur.

In some embodiments, the moldable resin composition is capable of being shaped as formed, at substantially ambient conditions. In some embodiments, diluents, thinners, or plasticizers may be added to facilitate shaping. In still other embodiments, conditions of pressure and/or temperature above ambient may be employed to also facilitate or enable shaping.

IV. Neutron Radiation Detector

Shaped articles made of the NSC composite described herein can be used in a neutron-counting detector comprised of: [1] a Li based neutron scintillator composite (NSC) as described herein, [2] an optical-coupling medium (e.g., optical grease, optical fibers, and the like), and [3] a photosensor (e.g., a photomultiplier tube, a semiconductor diode, array of diodes, and the like). Upon exposure to thermalized neutron radiation, the Li isotope captures neutrons, disintegrating into energized alpha and triton particles. These particles stimulate photon emission in the neutron scintillator composite. The photons are channeled via the optical-coupling medium into the sensor where they are counted.

A suite of illustrative, but non-limiting, schematic embodiments, showing a shaped, neutron sensitive article in a radiation detector, are shown in FIGS. 1-4.

FIG. 1 shows the simplest embodiment of a radiation detector 10 of the invention in which the Li-based neutron scintillator composite (NSC) of the disclosure is shaped into a transparent body 12 to serve as a neutron sensing element that matches in cross-sectional size to the light sensitive area of a photosensor 14. As used herein, "transparent" is defined as a material that has an index of refraction that allows photons at a desired wavelength to travel through the material with little or no attenuation. In this embodiment, only a thin layer of optical coupling medium 16 (optical grease, epoxy, RTV silicone, RTV silicone rubber, and the like) is used at the interface between transparent body 12 of NSC and the photosensor 14 to optimize the transmission of the light photons from the transparent body 12 to the active area of the photosensor 14. It will be appreciated that the invention can be practiced with any suitable photosensor acting as the photo-sensing element, and that the use herein of the particular shape of the transparent body 12 of NSC and the photosensor 14 is merely illustrative and non-limiting.

Figure 2:
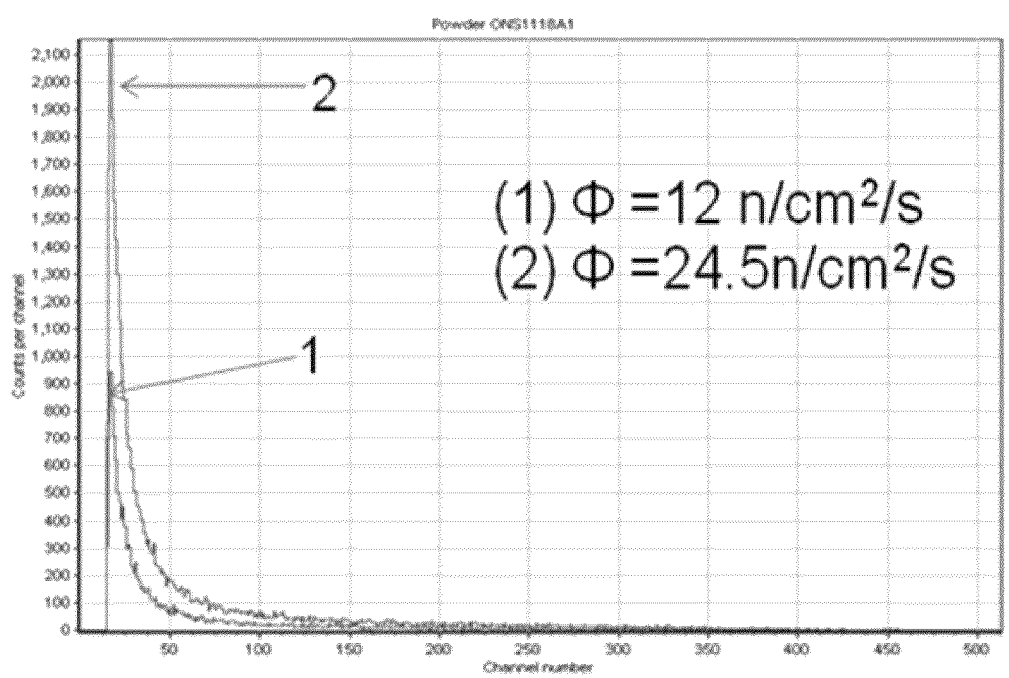
FIG. 2 shows the light emitted (counts per channel) by an embodiment of the scintillator of the disclosure when exposed to a neutron flux of (1) 12 n/cm$_2$/sec and at (2) 24.5 n/cm$_2$/sec.

FIG. 2 depicts an embodiment of a radiation detector 20 of the invention in which the Li-based neutron scintillator composite (NSC) of the disclosure is formed in a large transparent body 22 to serve as a neutron sensing element that is larger than the light sensitive area of the photosensor 24. In this embodiment, the optical coupling medium 26 consists of a shaped optical guide, for example, a plurality of optical guides with the purpose of collecting light from the NSC body 22 and transmitting the light to the photosensor(s) 24 with minimum light loss. It is evident to those skilled in the art that the invention embodiment depicted in FIG. 2 can be realized with any suitable photosensor(s) 24 and light guide(s) 26 and that the use of the particular shape of the transparent body 22 of NSC and the photosensor(s) 24 is illustrative and non-limiting.

Figure 3:
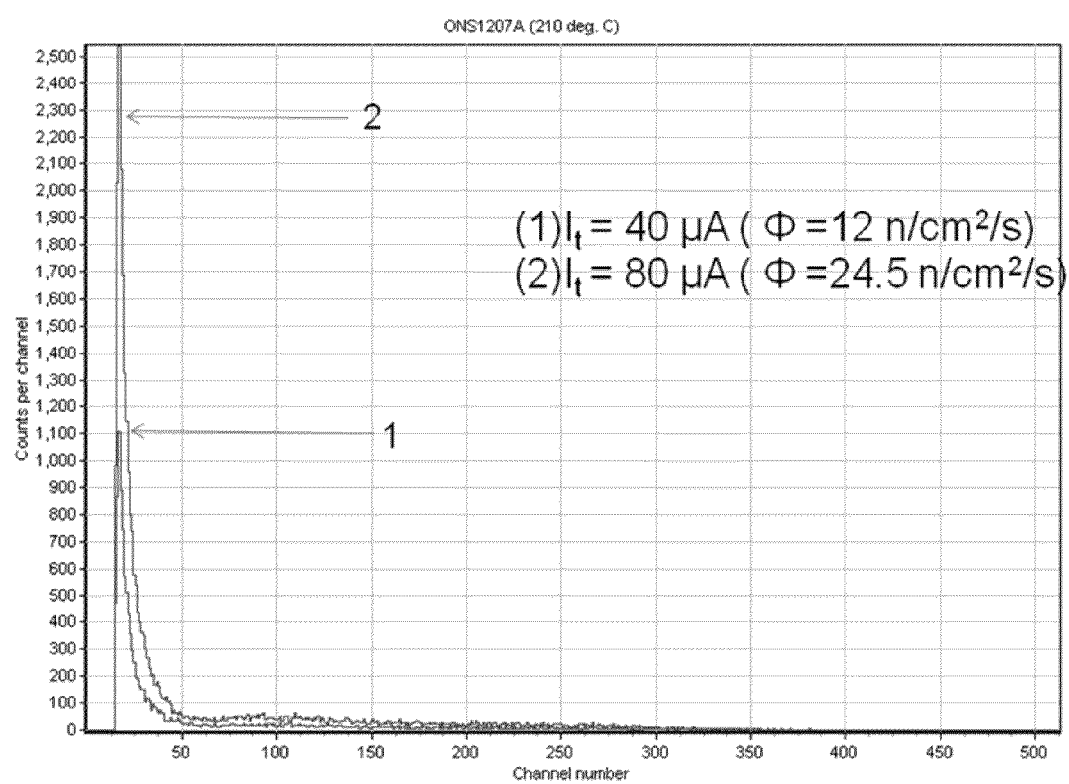
FIG. 3 shows the light emitted (counts per channel) by a disk comprising a neutron scintillator composite of the disclosure comprising $Li_6Mg_{0.99}Ce_{x=0.01}Br_8$ and pressed at a temperature of 210° C.

Similarly, FIG. 3 illustrates an embodiment of a radiation detector 30 of the invention in which the size mismatch between the light exit area of the transparent body 32 of NSC and the entrance area for a single photosensor device 34 is compensated by an array of a plurality of photosensors 34 directly coupled optically by a thin layer 36 of optical medium (optical grease, epoxy, RTV silicone, RTV silicone rubber, and the like). It will be appreciated that the invention can be practiced with any suitable photosensor 34, such as semiconductor diodes, silicon photomultiplier arrays, photomultiplier tubes, etc, and that the use herein of the particular shape of the NSC body 32 and the photosensor(s) 34 is merely illustrative and non-limiting and can be adapted by those skilled in the art to any shape of the NSC body and/or the photosensor active area.

Figure 4:
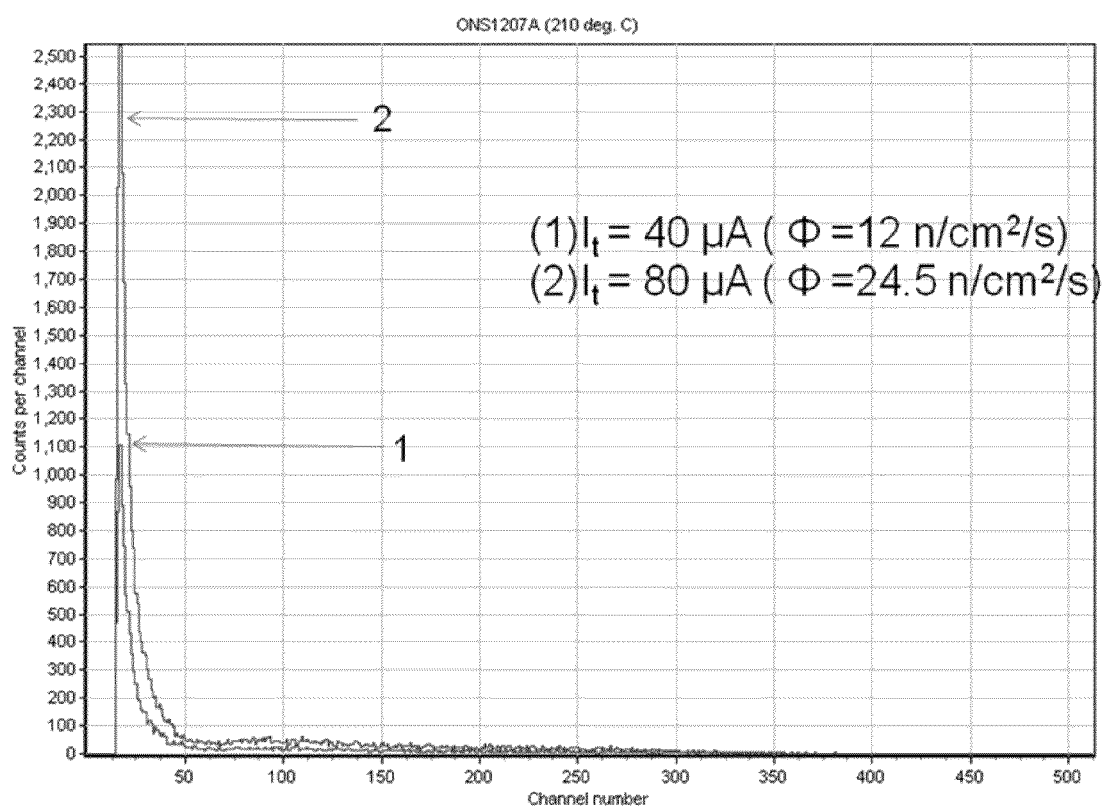
FIG. 4 shows the light emitted (counts per channel) by a disk comprising a neutron scintillator of the disclosure comprising $Li_6Mg_{0.99}Ce_{x=0.01}Br_8$ and pressed at a temperature of 230° C.
Figure 5:
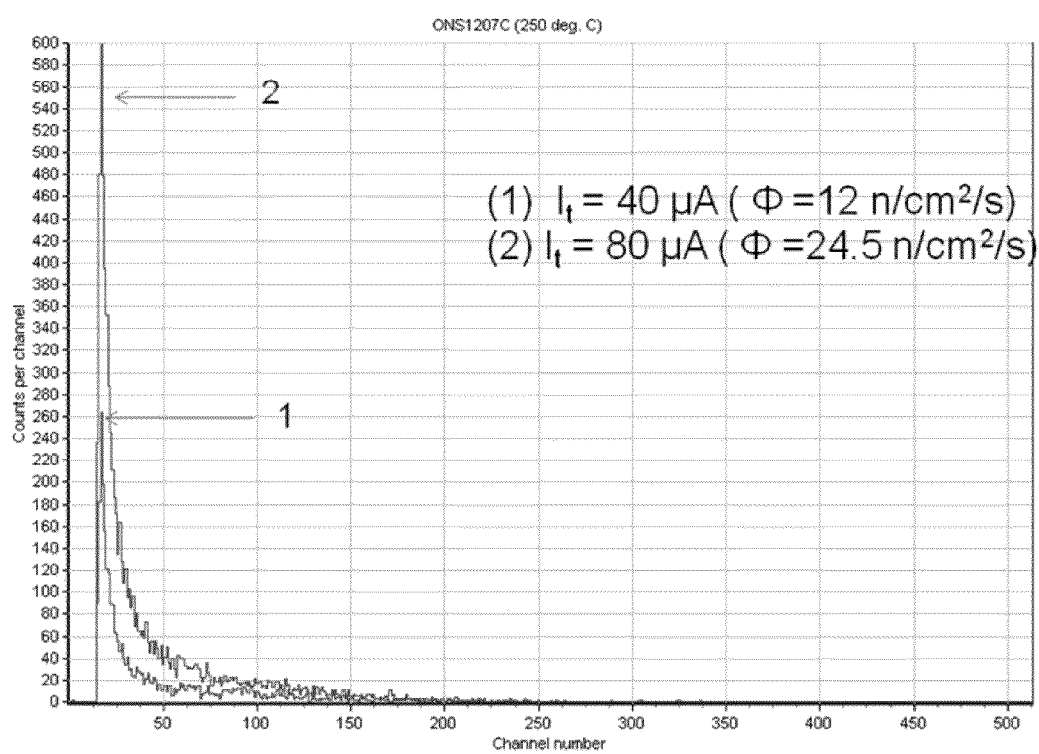
FIG. 5 shows the light emitted (counts per channel) by a disk comprising a neutron scintillator of the disclosure comprising $Li_6Mg_{0.99}Ce_{x=0.01}Br_8$ and pressed at a temperature of 250° C.

FIG. 4 shows an embodiment of a radiation detector 40 of the invention in which the optical coupling medium is distributed throughout a body 42 of the Li-based neutron scintillator composite (NSC) of the disclosure with the purpose of collecting the scintillation light and channel the photons to the light sensitive area of a photosensor 44. It will be apparent to those skilled in the art, a bundle of optical fibers 46 can be used to collect and transmit the light as described. It is also appreciated that the type of optical fibers, their number, dimensions, composition, refractive index, and other optical properties, such as the ability to shift the wavelength of the scintillation light, can be suitably matched to the size of the body 42 of NSC and the photosensor 44, the light emission distribution and refractive index of the NSC of the disclosure, and the spectral sensitivity characteristics of the photosensor 44. For these reasons, the use herein of the particular shape of the body 42 of NSC and the photosensor 44 in FIG. 4 is merely illustrative and non-limiting.

As described above, the neutron scintillator composite of the disclosure is comprised of [1] a Li-containing neutron scintillator particulate material (i.e., powder, coarse particles, and the like), and [2] a binder having an index of refraction substantially identical to the index of refraction of the neutron scintillator particulate material.

There are several advantages to the transparent NSC of the disclosure. First, the transparent NSC of the disclosure simultaneously combines scintillator functionality with that of an optical waveguide. The indices of refraction for both the scintillator particulate material and the binder are substantially identical, thereby minimizing scattering at the scintillator-binder interface(s). This feature produces transmission efficiencies that approach single crystal embodiments, but without the latter's higher cost.

Second, the binder enables the ready fabrication (i.e., via molding, casting, extruding, etc.) of shapes useful for neutron detection in large, commercially-relevant volumes. This advantage is absent in single crystal embodiments where slow growth rates reduce manufacturing throughput. Machining of the latter to produce desired shapes (e.g., cutting, polishing, etc.) also adds notably to their manufacturing cycle times and cost.

The following written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

EXAMPLES

Example 1

For the preparation of one embodiment of the neutron scintillator composite of the disclosure, in which the neutron scintillator has the formula, $Li_6Mg_{0.99}Ce_{0.01}Br_8$, stoichiometric amounts of $LiBr$, $MgBr_2$ and $CeBr_3$ were ground to a fine powder and heated to a temperature of 600°-800° C. in a furnace, which was located within a glove box essentially free of moisture and air. Alternatively, the ground material can be transferred to a quartz or silver tube, which is then evacuated and sealed. The tube is heated to temperatures between 600-800° C. Following the heat treatment, the samples are reground to a fine powder before being evaluated for their detection ability.

A neutron flux box similar to that shown in FIG. 1, comprising components known to those of skill in the art was used to generate neutrons. The composite sample was affixed to a photomultiplier tube. Polyethylene walls of? within? the neutron flux box convert "fast" neutrons from the neutron source into "thermal neutrons." The scintillation light spectrum of the $Li_6MgBr_8$:Ce scintillator in powder form is shown in FIG. 2.

Example 2

Mixing of Neutron Scintillator with Binder to Form Composite

A neutron scintillator was obtained as described in Example 1 and then combined with a polycarbonate thermoplastic binder at a concentration of 16% by weight (6% by volume) to form a composite mixture. Briefly, 0.056 grams of $Li_6MgBr_8$:Ce powder were mixed with 2.87 grams polycarbonate and the mixture was hot pressed at temperatures of 210° C., 230° C. and 250° C. into 1.5" diameter discs with a thickness of 0.09". The discs were then affixed to a photomultiplier tube of a neutron excitation apparatus (see FIG. 1) to evaluate their scintillation capacity.

The light emitted by each of the composite discs in response to two different neutron fluxes was evaluated. The total count rate for each disc for each temperature is shown in Table 1. Pulse amplitude histograms (spectra) for each disc are shown in FIGS. 3 (T=210° C.), 4 (T=230° C.) and 5 (T=250° C.).

TABLE 1

| Neutron flux Φ | Total count rate (counts/s) | | |
|---|---|---|---|
| (n/cm²/s) | T = 210° C. | T = 230° C. | T = 250° C. |
| 12.0 | 7.2 | 4.2 | 1.8 |
| 24.5 | 16.9 | 9.8 | 4.7 |

Composite discs formed at 210° C. showed peak emissions of approximately 1100 and 2500 counts per channel when exposed to neutron flux generated at 70 kV and a target current of either 40 μA or 80 μA, respectively. The light emitted therefore, was proportional to the amount/number of incident neutrons. Though peaks were lower, discs pressed at 230° C. and 250° C. exhibited the same proportional relationship between the two neutron flux rates as the disks pressed at 210° C.

Figure 6:
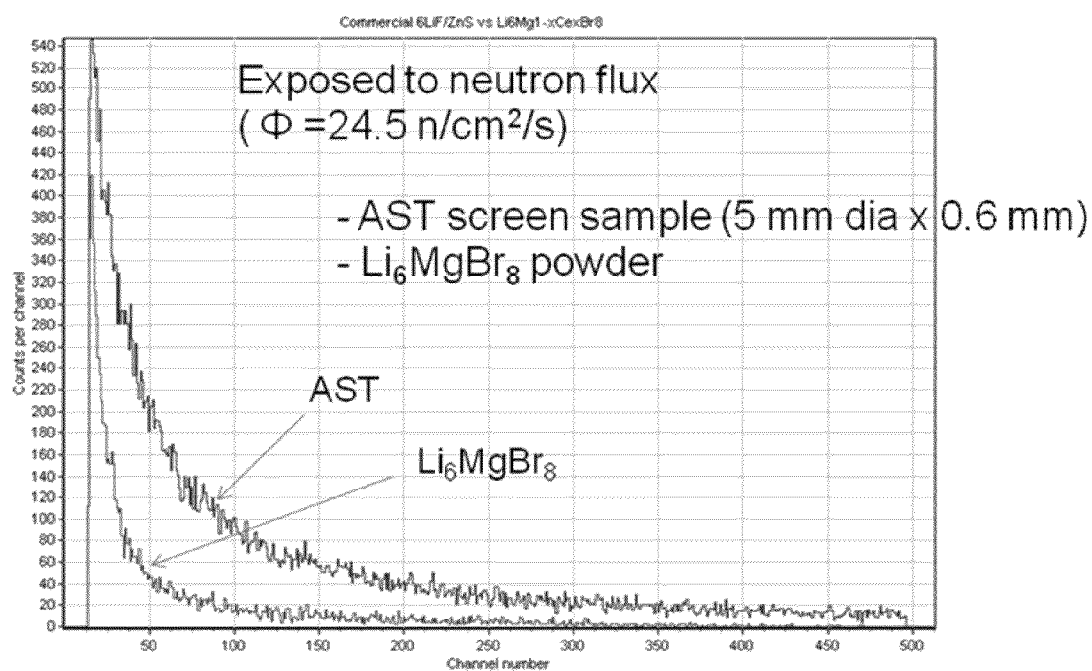
FIG. 6 shows that the Li-based neutron scintillator of the disclosure is comparable to a commercial neutron screen (AST).

FIG. 6 shows that the ability of the neutron scintillator composite described herein to detect neutrons is comparable to a commercially available neutron screen.

The invention claimed is:

1. A neutron scintillator composite, comprising:
a neutron scintillator of the formula $Li_yMgBr_{y+2}$, where y=2, 4 or 6; and
a binder having an index of refraction that is substantially identical to an index of refraction of the neutron scintillator.

2. The composite of claim 1, wherein the neutron scintillator incorporates a scintillation activator.

3. The composite of claim 2, wherein the scintillation activator comprises cerium.

4. The composite of claim 3, wherein the neutron scintillator has the formula $Li_yMg_{1-x}Ce_xBr_{y+2}$ where $0 \leq x < 1$ and y=2, 4 or 6.

5. The composite of claim 3, wherein the neutron scintillator is $Li_6Mg_{1-x}Ce_xBr_8$, where $0 \leq x < 1$.

6. The composite of claim 3, wherein the neutron scintillator is $Li_4Mg_{1-x}Ce_xBr_6$, where $0 \leq x < 1$.

7. The composite of claim 3, wherein the neutron scintillator is $Li_2Mg_{1-x}Ce_xBr_4$, where $0 \leq x < 1$.

8. The composite of claim 1, wherein the binder is selected from a thermoplastic resin and a thermoset resin.

9. The composite of claim 1, wherein the binder is selected from the group consisting of acrylate-based resin, epoxy resin, polycarbonate resin, and combinations thereof.

10. The composite of claim 1, wherein the neutron scintillator composite has sufficient flowability to be formed into a shaped article.

11. A method for making a neutron scintillator composite comprising:
   mixing (a) a neutron scintillator of formula $Li_yMgBr_{y+2}$, where y=2, 4 or 6
   and (b) a binder.

12. The method of claim 11, wherein the neutron scintillator further comprises a scintillation activator.

13. The method of claim 11, wherein the scintillation activator is cerium.

14. The method of claim 11, wherein the neutron scintillator has the formula $Li_yMg_{1-x}Ce_xBr_{y+2}$, where $0 \leq x < 1$ and y=2, 4 or 6.

15. The method of claim 11, wherein the binder comprises a thermoplastic resin or a thermoset resin.

16. The method of claim 11, wherein the binder is selected from the group consisting of acrylate-based resin, epoxy resin, polycarbonate resin, and combinations thereof.

17. The method of claim 11, wherein the binder provides the neutron scintillator composite with sufficient flowability to be formed into a shaped article.

18. An article comprising the neutron scintillator composite of claim 1.

19. The article of claim 18, wherein the article is a radiation detector comprising the neutron scintillator composite of claim 1 optically coupled to a photosensor.

20. The radiation detector of claim 19, wherein the neutron scintillator composite forms a neutron sensing element of the radiation detector, wherein photons emitted within the neutron sensing element are collected and channeled through the neutron sensing element and into a photosensing element.

21. A method for making a neutron scintillator composite, the method comprising mixing a Ce-containing neutron scintillator of the formula $Li_yMgBr_{y+2}$, where y=2, 4 or 6 and a binder having an index of refraction that is substantially identical to an index of refraction of the neutron scintillator.

22. The method of claim 21, wherein the amount of neutron scintillator present in the composite is about 5% to about 60% by weight.

23. The method of claim 21, wherein the amount of neutron scintillator present in the composite is about 10% to about 30% by weight.

24. The method of claim 21, wherein the amount of neutron scintillator present in the composite is about 15% to about 20% by weight.

25. The method of claim 21, wherein the amount of neutron scintillator present in the composite is about 5% to about 30% by volume.

26. The method of claim 21, wherein the Ce-containing neutron scintillator of formula $Li_yMgBr_{y+2}$, where y=2, 4 or 6 is prepared by:
   (a) combining stoichiometric amounts of LiBr, MgBr2 and CeBr3 to obtain a mixture;
   (b) grinding the mixture to obtain a fine powder;
   (c) heating the powder to a temperature of about 600° C. to about 800° C. to obtain the neutron scintillator.

27. The method of claim 26, wherein said heating step is performed in an environment essentially free of moisture and air.

* * * * *